US011813932B2

(12) United States Patent
Fowler et al.

(10) Patent No.: US 11,813,932 B2
(45) Date of Patent: Nov. 14, 2023

(54) DRIVE SYSTEM

(71) Applicant: Oakmoore Pty Ltd, Salisbury (AU)

(72) Inventors: Shane Fowler, Salisbury (AU); Wolfgang Schollhammer, Salisbury (AU); Zenon Theodoulou, Salisbury (AU)

(73) Assignee: Oakmoore Pty Ltd., Salisbury (AU)

( * ) Notice: Subject to any disclaimer, the term of this patent is extended or adjusted under 35 U.S.C. 154(b) by 456 days.

(21) Appl. No.: 17/058,310

(22) PCT Filed: May 22, 2019

(86) PCT No.: PCT/AU2019/050495
§ 371 (c)(1),
(2) Date: Nov. 24, 2020

(87) PCT Pub. No.: WO2019/227133
PCT Pub. Date: Dec. 5, 2019

(65) Prior Publication Data
US 2021/0206246 A1 Jul. 8, 2021

(30) Foreign Application Priority Data

May 31, 2018 (AU) .................................. 2018901951

(51) Int. Cl.
B60J 7/02 (2006.01)
B60J 7/04 (2006.01)
(Continued)

(52) U.S. Cl.
CPC ............ B60J 7/0573 (2013.01); B60J 7/068 (2013.01); B60J 7/02 (2013.01); B60J 7/04 (2013.01);
(Continued)

(58) Field of Classification Search
CPC .......... E05F 15/00; E05F 15/60; E05F 15/603; E05F 15/632; E05F 15/643;
(Continued)

(56) References Cited

U.S. PATENT DOCUMENTS 3,516,469 A 6/1970 McDonald
5,040,843 A 8/1991 Russell et al.
(Continued)

FOREIGN PATENT DOCUMENTS

EP 0822311 B1 9/1999
WO 1998/032943 A1 7/1998

OTHER PUBLICATIONS

International Search Report and Written Opinion for PCT/AU2019/050495 dated Jul. 2, 2019 (9 pages).

*Primary Examiner* — Dennis H Pedder
*Assistant Examiner* — Joyce Eileen Hill
(74) *Attorney, Agent, or Firm* — Oakmoore Pty Ltd

(57) ABSTRACT

A drive system for operation of a roll top cover for covering a cargo bed of a vehicle enables improved and smoother roll top cover movement. The drive system includes: an elongate housing that defines a longitudinal axis and first and second ends, the housing including an axially extending aperture for receiving the roll top cover therethrough; first and second receiving plates disposed transversely within the housing at the respective first and second ends thereof, the receiving plates comprising opposed spiral-shaped slots extending therethrough, each of the spiral-shaped slots having an open end proximally and a closed end distally; and a drive shaft assembly disposed within the housing and extending axially between the first and second ends thereof; wherein the drive shaft assembly is adapted for being operably connected to a drive chain and driving movement thereof within the spiral-shaped slots during operation of the roll top cover.

9 Claims, 8 Drawing Sheets

(51) Int. Cl.
    *B60J 7/057* (2006.01)
    *B60J 7/06* (2006.01)
    *B60J 7/08* (2006.01)
    *B60J 7/16* (2006.01)
    *E05F 15/00* (2015.01)
    *E05F 15/632* (2015.01)
    *B60P 7/02* (2006.01)
    *B60P 7/04* (2006.01)

(52) U.S. Cl.
CPC ............ *B60J 7/041* (2013.01); *B60J 7/067* (2013.01); *B60J 7/085* (2013.01); *B60J 7/1607* (2013.01); *B60P 7/02* (2013.01); *B60P 7/04* (2013.01); *E05F 15/00* (2013.01); *E05F 15/632* (2015.01); *E05Y 2201/656* (2013.01); *E05Y 2201/66* (2013.01); *E05Y 2201/668* (2013.01); *E05Y 2900/53* (2013.01)

(58) Field of Classification Search
CPC ........... E05Y 2201/656; E05Y 2201/66; E05Y 2201/668; E05Y 2201/644; E05Y 2900/53; B60J 7/04; B60J 7/057; B60J 7/14; B60J 7/141; B60J 7/067; B60J 7/068; B60J 7/085; B60J 7/1607; B60J 7/041; B60P 7/02; B60P 7/04; E06B 9/15; E06B 9/17; E06B 9/56; E06B 9/58; E06B 9/68
USPC .... 296/98, 100.01, 100.018, 100.03, 100.05, 296/100.11, 100.12, 100.17, 136.03
See application file for complete search history.

(56) References Cited

U.S. PATENT DOCUMENTS 6,305,456 B1 * 10/2001 Sanchez .................... E06B 9/74
                                                                                            160/188
2018/0118002 A1 * 5/2018 Koengeter ............... B60P 7/02

* cited by examiner

DRIVE SYSTEM

CROSS-REFERENCE TO RELATED APPLICATIONS

This application is a national stage of, and claims priority to, Patent Cooperation Treaty Application No. PCT/AU2019/050495, filed on May 22, 2019, which application claims priority to Australian Patent Application No. AU2018901951, filed on May 31, 2018, which applications are hereby incorporated herein by reference in their entireties.

BACKGROUND

Numerous types of truck bed covers can be arranged over the utility or cargo bed portion of a ute or pickup truck to secure and protect the bed including cargo items disposed therein. In particular, roll top covers generally include a motorized or mechanical drive system for operably covering and uncovering the top of an open cargo bed, truck box or the like by way of an extendable and retractable slat assembly and drive chain or assembly.

Prior art roll top covers can suffer from a number of drawbacks. By way of example, such roll top covers may not be fully weather resistant and/or impervious to moisture and dust. Additionally, the frictional forces that are produced between the slat assembly and the associated side rail during operation (i.e., opening and/or closing) of the roll top cover can be significant so as to make closing and/or opening difficult for a user. Further to this, movement or vibration of the slats of the roll top cover can result in the production of undesirable noise during operation of the associated vehicle.

Accordingly, an improved roll top cover that overcomes one or more of the above disadvantages is required.

BRIEF DESCRIPTION OF THE DRAWINGS

To assist in understanding the disclosure and to enable a person skilled in the art to put the disclosure into practical effect, the disclosure will be described by way of example only with reference to the accompanying drawings, in which.

DETAILED DESCRIPTION

Figure 1:
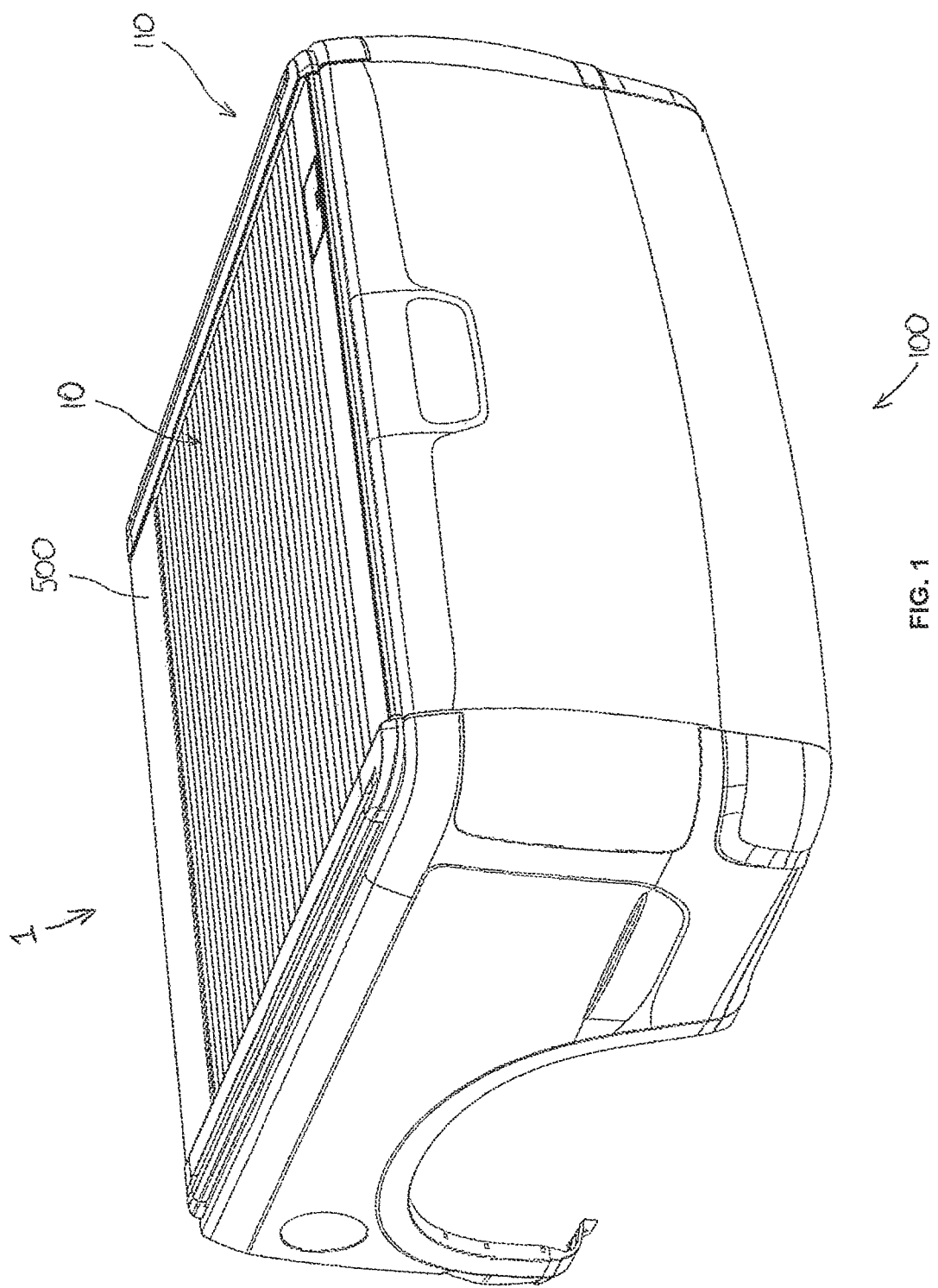
FIG. 1 is a top-down perspective view of a roll top cover suitably installed on a vehicle.

According to a first aspect, although not necessarily the only aspect or the broadest aspect, the disclosure includes a drive system for operation of a roll top cover for a cargo bed of a vehicle comprising:

an elongate housing that defines a longitudinal axis and first and second ends, the housing including an axially extending aperture for receiving the roll top cover therethrough;

first and second receiving plates disposed transversely within the housing at the respective first and second ends thereof, the receiving plates comprising opposed spiral-shaped slots extending therethrough, each of the spiral-shaped slots having an open end proximally and a closed end distally;

a drive shaft assembly disposed within the housing and extending axially between the first and second ends thereof;

wherein the drive shaft assembly is adapted for being operably connected to a drive chain and driving movement thereof within the spiral-shaped slots during operation of the roll top cover.

In one example, each of the receiving plates further comprise a curved channel adjacent the open end of the spiral-shaped slots and extending downwardly therefrom, the curved channel for receiving and rotatably supporting an end portion of the drive shaft assembly therein.

The receiving plates further comprise one or more supporting elements disposed on a lateral surface thereof and extending transversely across their respective spiral-shaped slot. With respect to such examples, the supporting elements preferably comprise one or more recessed portions, each recessed portion overlying an open portion of the spiral-shaped slot so as to facilitate passage of the drive chain therethrough. Even more preferably, the supporting elements further comprise one or more engagement elements for engaging the housing.

The housing further comprises a pair of opposed end plates disposed at respective first and second ends thereof, the end plates disposed adjacent their respective receiving plates so as to define a cavity therebetween. Preferably, each of the end plates comprises a supporting ledge extending laterally therefrom for attaching to a side rail of the roll top cover.

In particular example, the drive shaft assembly comprises:

a drive shaft that extends axially within the housing between the first and second ends thereof and defines first and second free ends;

a pair of sprockets coaxially engaged to the drive shaft at opposing ends thereof and adjacent the first and second free ends, the sprockets configured for contacting and driving movement of the drive chain within the spiral-shaped slots.

In particular examples, each of the sprockets are disposed between their respective receiving plate and end plate within the cavity defined thereby.

In other examples, the first and second free ends of the drive shaft are rotatably disposed within respective grommets that extend through each of the end plates.

A roll top cover assembly for operably covering a cargo bed of a vehicle may include the drive system of the previous aspect.

Particular advantages of the drive system of the present disclosure include providing improved and smoother control and operation of an associated drive chain and slat assembly that significantly reduces any movement, in particular twisting and/or side to side movement, therebetween. A further advantage resides in the provision of a drive system that contributes to the drainage of any debris, fluids, dust and the like therefrom. An additional advantage resides in the provision of a smaller housing or canister for receiving the associated slat assembly and drive chain of the roll top cover therein and thereby occupying less space within the cargo bed or tray of a vehicle.

FIGS. 1 to 8 provide an example of a drive system 500. As illustrated in FIG. 1, the drive system 500 is configured for being a part of a roll top cover 1 for covering a cargo bed 110 of a vehicle 100. In the example provided, the drive system 500 is configured to be operably connected to a drive chain 300 and an associated slat assembly 10 so as to allow for operation of the roll top cover 1 between an open or retracted position and a closed or extended position, as illustrated by FIG. 1. The slat assembly 10 is constructed of a plurality of successive and pivotably interconnected slats 11. Similarly, the drive chain 300 comprises a plurality of successive and pivotably interconnected drive chain elements 301, with each drive chain element 301 engaged to opposed side portions or end walls of a single slat 11.

Figure 2:
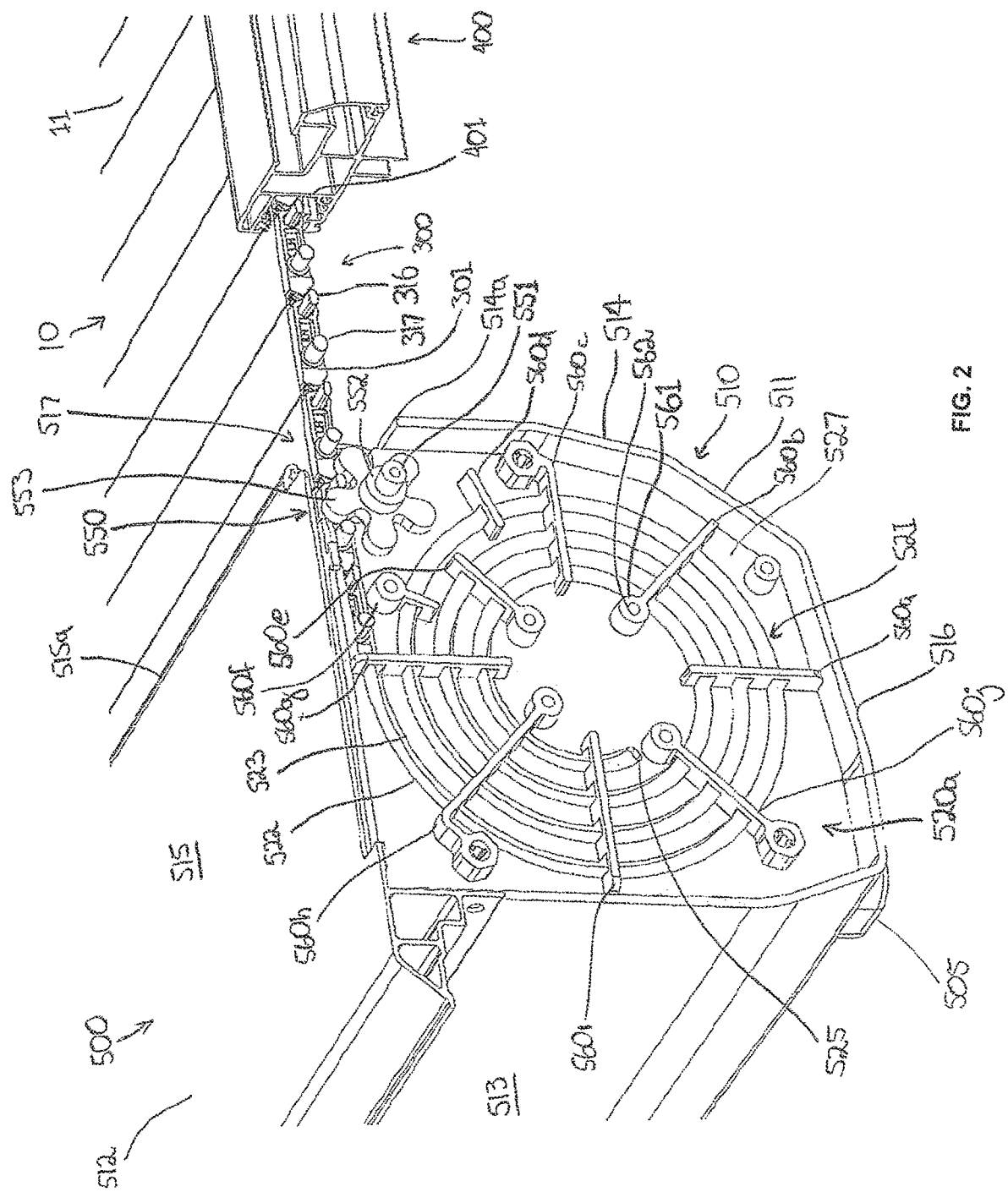
FIG. 2 illustrates a perspective view of a drive system for operation of the roll top cover of FIG. 1 prior to installation on a vehicle.
Figure 3:
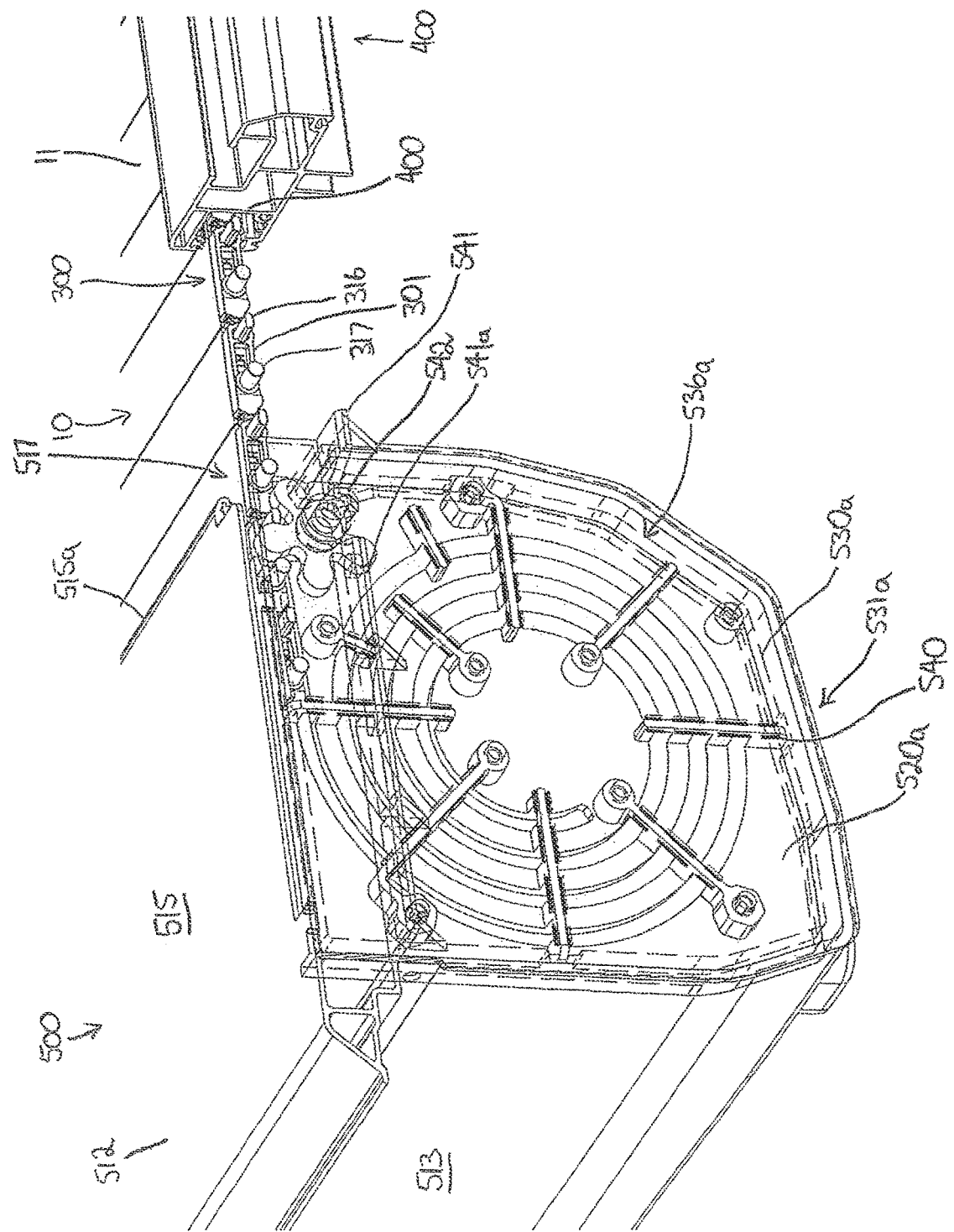
FIG. 3 is a further perspective view of the drive system of FIG. 2 with an end plate thereof shown in phantom lines.
Figure 4:
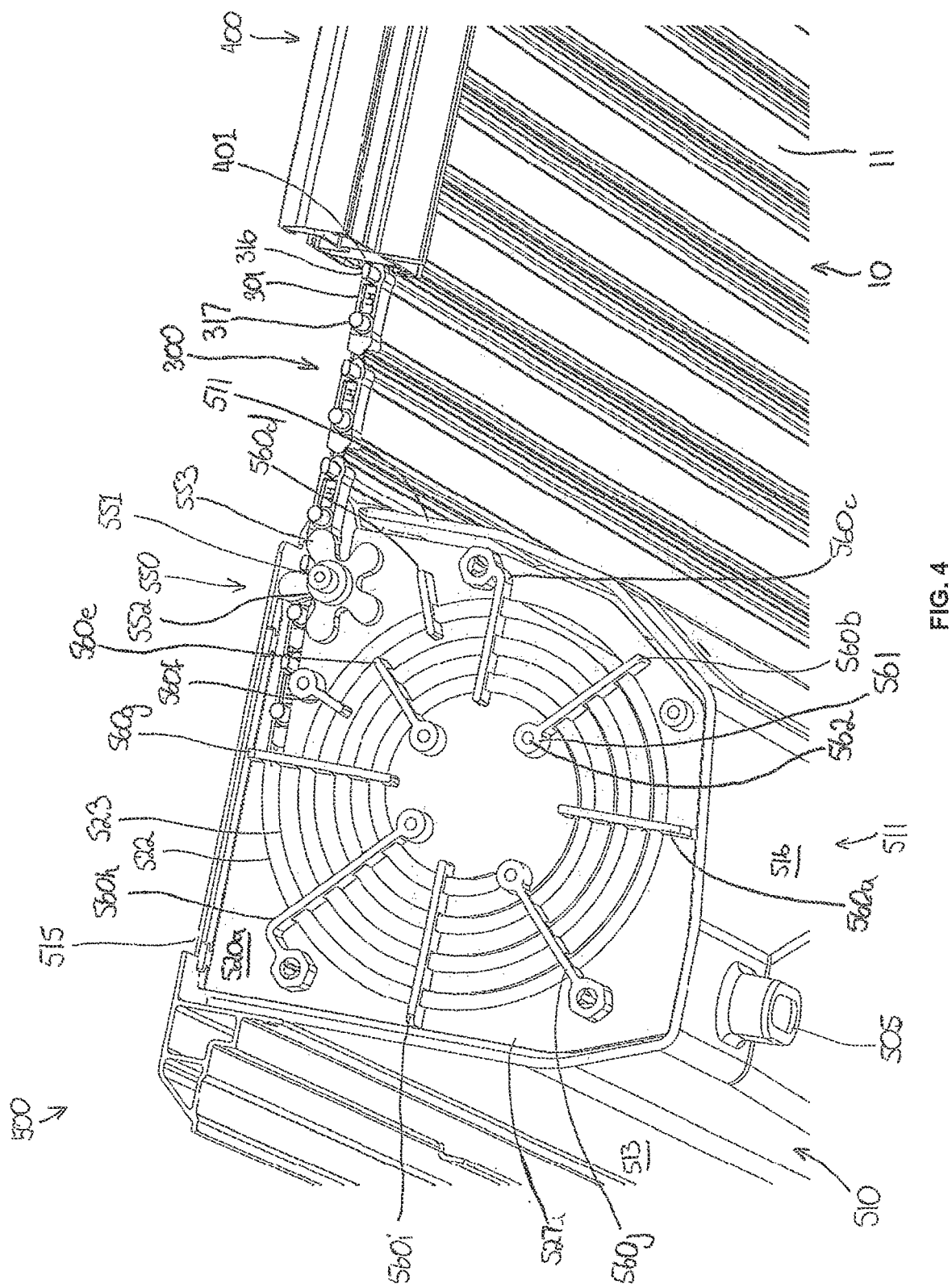
FIG. 4 illustrates a bottom-up perspective view of the drive system of FIG. 2.

As shown in FIGS. 2 to 4, each drive chain element 301 is configured for operably connecting its respective slat 11 to a drive chain track 401 of a side rail 400. From the Figures, it can be observed that the roll top cover 1 is operable by way of the drive system 500 to move between the extended position, in which the slats 11 of the slat assembly 10 are arranged and extend within the respective drive chain track 401 of opposed side rails 400 so as have the respective upper surfaces 60 thereof substantially flush theretogether and thereby define a substantially flattened or planar arrangement of the slat assembly 10 (i.e., to restrict access to the underlying cargo bed 110, see FIG. 1), and the retracted position, in which the slat assembly 11 attains a substantially curved or spiral arrangement so as to enable a user access to the cargo bed 110 thereunder.

Referring to FIGS. 2 to 4, the drive system 500 includes an elongate canister or housing 510 having first and second ends 511,512 that define a longitudinal axis therebetween. The housing 510 further includes front and rear side walls 513,514 as well as upper and lower side walls 515,516. As can be observed in FIGS. 2 and 3, an aperture or slot 517 is disposed in an upper portion of the rear side wall 514 that extends axially the entire length of the housing 510 for receiving the slat assembly 11 and drive chain 300 therethrough. In this way, each of the upper and rear side walls 515,514 define respective free ends 515a,514a thereof. It will be appreciated that the housing 510 of the drive system 500 is designed to be installed in a transverse position in a front end of the cargo bed 110 of the vehicle 100. The housing 510 defines a space (not shown) in which the slat assembly 10 and drive chain 300 are substantially stored whilst the roll top cover 1 is the retracted position.

To this end and disposed transversely within the housing 510 are a pair of receiving plates 520a,b, which represent inverse or mirror arrangements of each other. The receiving plates 520a,b are respectively positioned at opposing first and second ends 511,512 of the housing 510 and adjacent respective end plates 530a,b thereof. In FIGS. 2 and 3, it will be apparent that the end plate 530a has been removed for illustration purposes.

As shown in FIGS. 2 to 6, each of the receiving plates 520a,b comprise opposed first and second tracks or walls 522,523 that define a substantially open-sided and spiral-shaped slot or channel 521 therebetween. In this manner, the spiral-shaped channel 521 is of suitable dimensions for operably receiving a portion of the slat assembly 10 and/or the drive chain 300 therein during operation of the roll top cover 1 to the retracted position. The spiral-shaped channel 521 commences at an open end 524 that is positioned at an upper portion of the receiving plate 520 and directed rearwardly or posteriorly towards the aperture 517 so as to be operably connected to the drive chain track 401 of the side rail 400 by way of a drive shaft assembly 550. From the open end 524, the spiral-shaped channel 521 then initially extends posteriorly in the receiving plate 520 in a curved manner to define a spiral therein which terminates at a closed end 525 positioned in a central portion thereof. Adjacent and extending downwardly from the open end 524 of the spiral-shaped channel 521 is disposed an arcuate or curved channel 526 for receiving and supporting end portions of the drive shaft assembly 550 therein.

This open-sided design for the spiral-shaped channel 521 affords a number of advantages over the prior art, and in particular closed U-groove style receiving plates. By way of example, the spiral-shaped channel 521 can be designed to be a tighter or more compact spiral-shape, which reduces the size of the slat assembly 10 when rolled up therebetween in the retracted position and thereby allows for a smaller housing 510 to accommodate the retracted slat assembly 10 therein. Additionally, the weight of the receiving plate 520, and hence the weight of the drive system 500 as a whole, can be reduced. The open-sided design of the spiral-shaped channel 521 also reduces the likelihood of debris, fluids, dust or the like being trapped or collecting therein, as movement of the drive chain 300 therethrough will assist or promote their removal from the spiral-shaped channel 521.

The receiving plates 520a,b have lateral and medial surfaces 527,528. Extending laterally outward from the respective lateral sides 527 of each of the receiving plates 520a,b are a plurality of raised and elongate support elements 560 that are integral therewith. Radially spaced and positioned with respect to a central portion or axis of the receiving plates 520a,b, each of the support elements 560a-j extend transversely across one or more (i.e., at least one and up to four) open portions the spiral-shaped channel 521. Further to this, the support elements 560a-j, each comprise one or more recessed portions, each recessed portion overlying an open portion of the spiral-shaped channel 521 that is bridged by their respective support element 560a-j. The recessed portions are of suitable dimensions so as to facilitate passage of drive pins 316, 317 of the drive chain 300 therethrough. In this way, the support elements 560a-j not only provide structural support to the spiral-shaped channel 521, but also facilitate or guide passage of the drive chain 300 through the spiral-shaped channel 521.

The support elements 560a-j further provide for the definition of a space or cavity (not shown) between the lateral surface 527 of the receiving plates 520A,B and an inner surface 531 of their respective end plate 530a,b adjacent thereto. This cavity (not shown) can advantageously assist in channeling debris, dust, fluids and the like draining from the side rail 400 or from the slat assembly 10 itself into a bottom portion of the housing 510 in a more controlled manner. As a result, the build up of material that could prevent or inhibit smooth passage of the drive chain 300 through the spiral-shaped channel 521 of the receiving plate 520a,b by action of the drive shaft assembly 550 is minimised. Relevant to this, the housing 510 further includes a drainage outlet 505.

Figure 5:
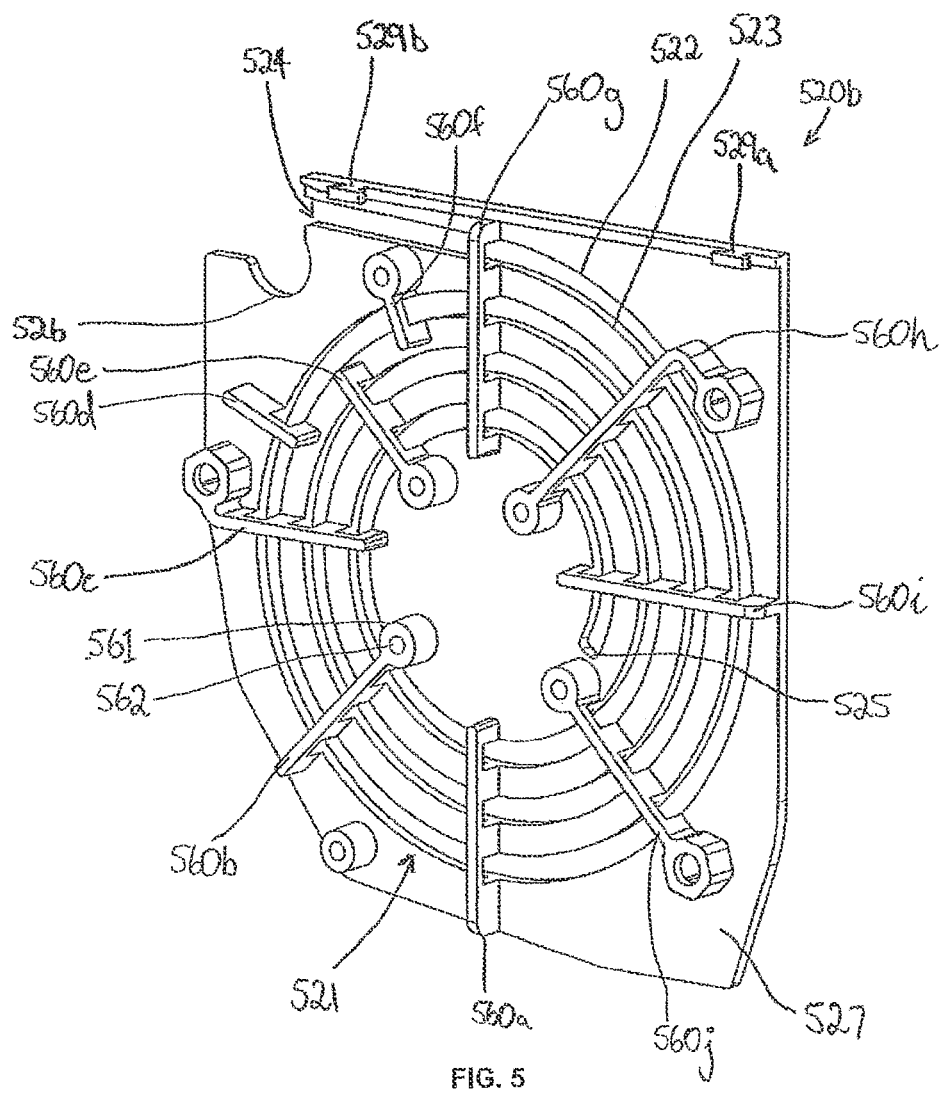
FIG. 5 illustrates a perspective view of an individual receiving plate of the drive system of FIG. 2.
Figure 6:
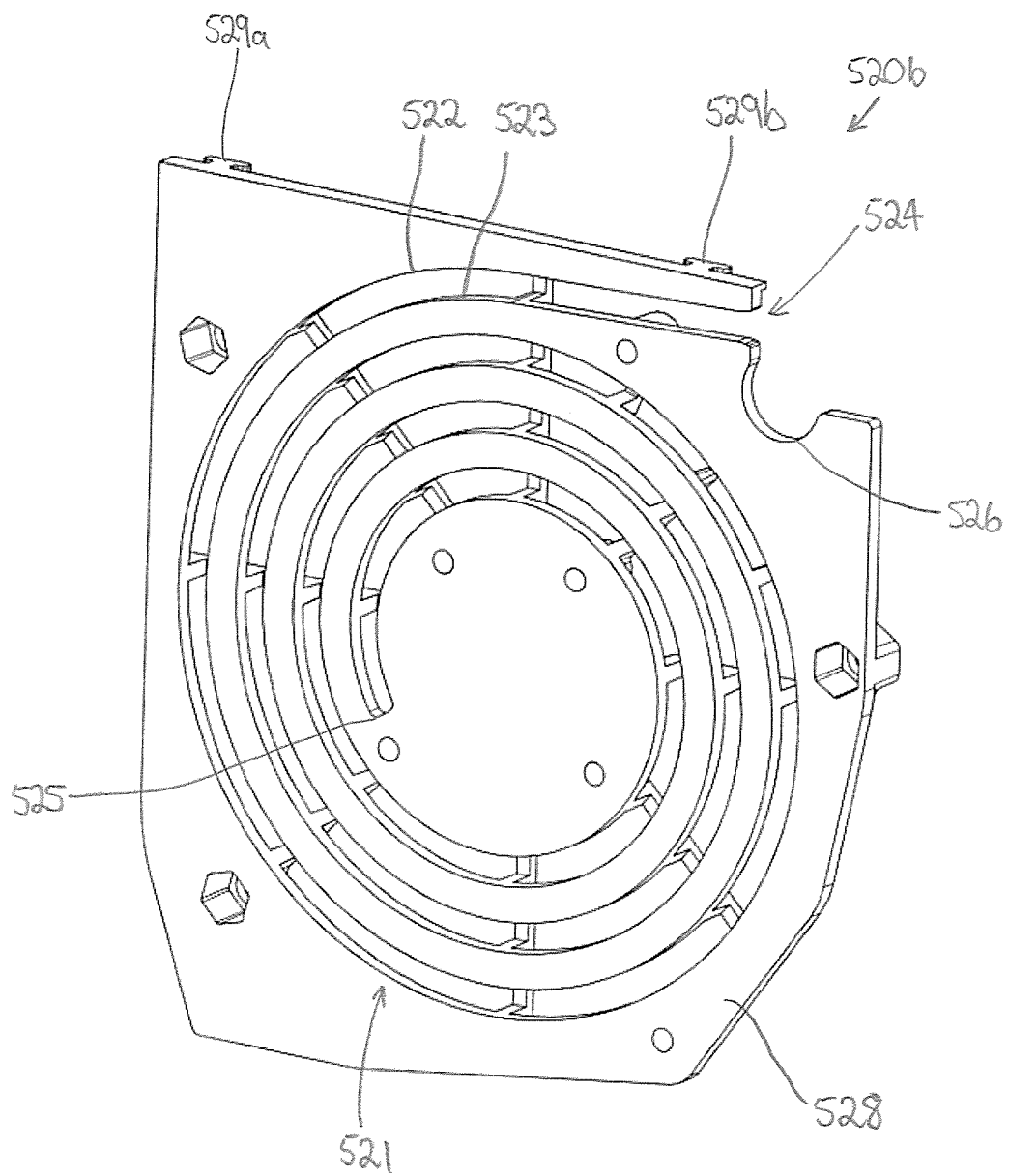
FIG. 6 provides a further perspective view of the receiving plate of FIG. 5.

As shown in FIGS. 2, 4 and 5, one or both of the free ends of a number of the support elements 560b,c,e,f,h,j comprise female engagement or mating elements 561 (labelled in FIGS. 2, 4 and 5 only in respect of support element 560b) having a central circular engagement aperture 562 adapted to receive a suitable fastener (e.g., bolt, screw, rivet and the like) therethrough. In addition, an upper end portion of the receiving plate 521 includes a pair of engagement members 529*a,b* extending laterally outward therefrom.

As noted earlier, the housing 510 in FIGS. 2 and 4 is shown to be open-ended at the first end 511 thereof, so as to assist in illustration of the internal features of the drive system 500. As alluded to earlier, however, each of the first and second ends 511,512 of the housing 510 is intended to be closed or sealed by way of the respective end plates 530*a,b*. To this end, the end plate 530*a* is shown attached to the housing 510 in FIG. 3 by way of phantom lines. The end plates 530*a,b* define respective first and second end walls 531*a,b* of the housing 510.

Figure 7:
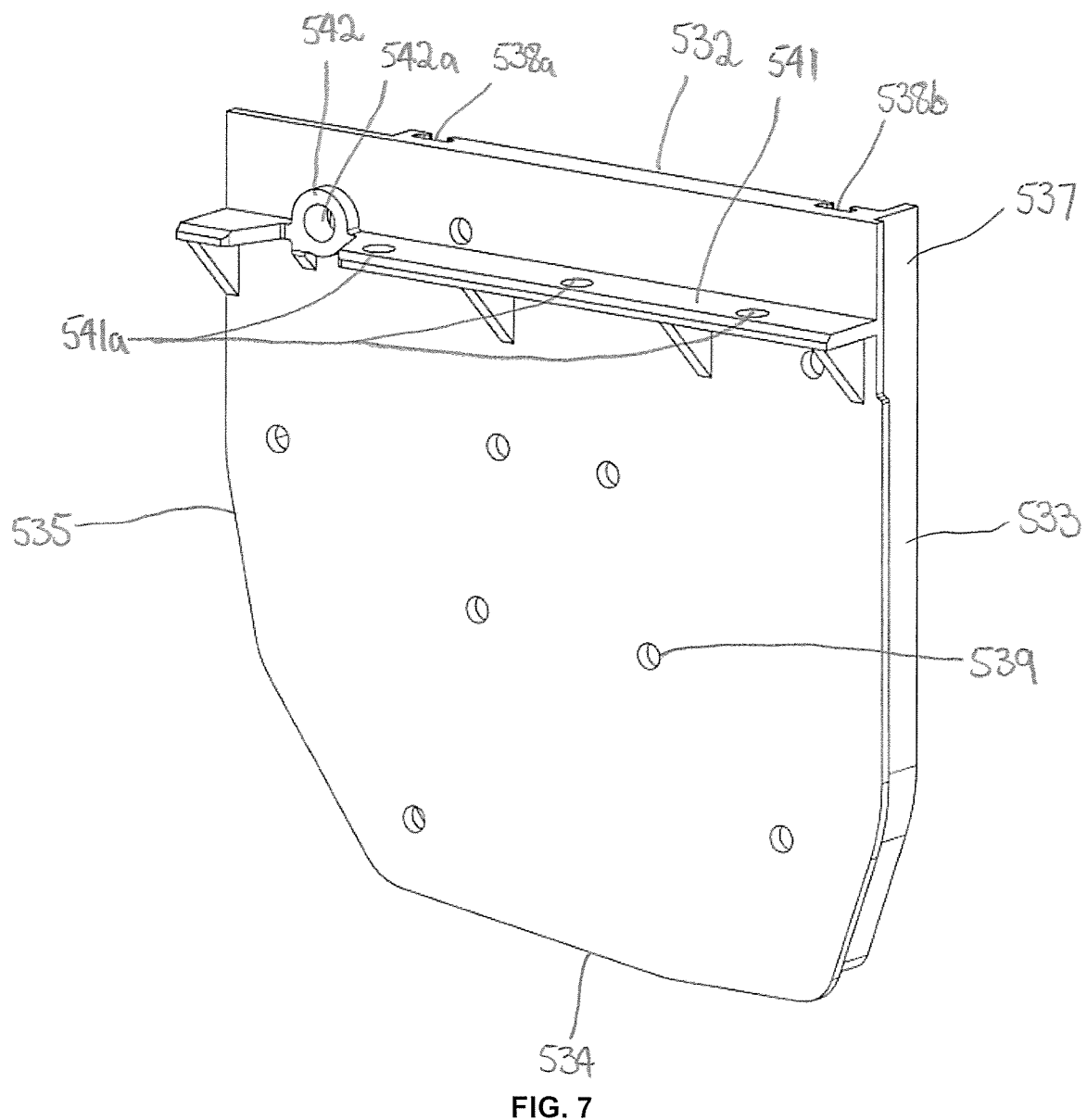
FIG. 7 displays a perspective view of an individual end plate of the drive system of FIG. 2.
Figure 8:
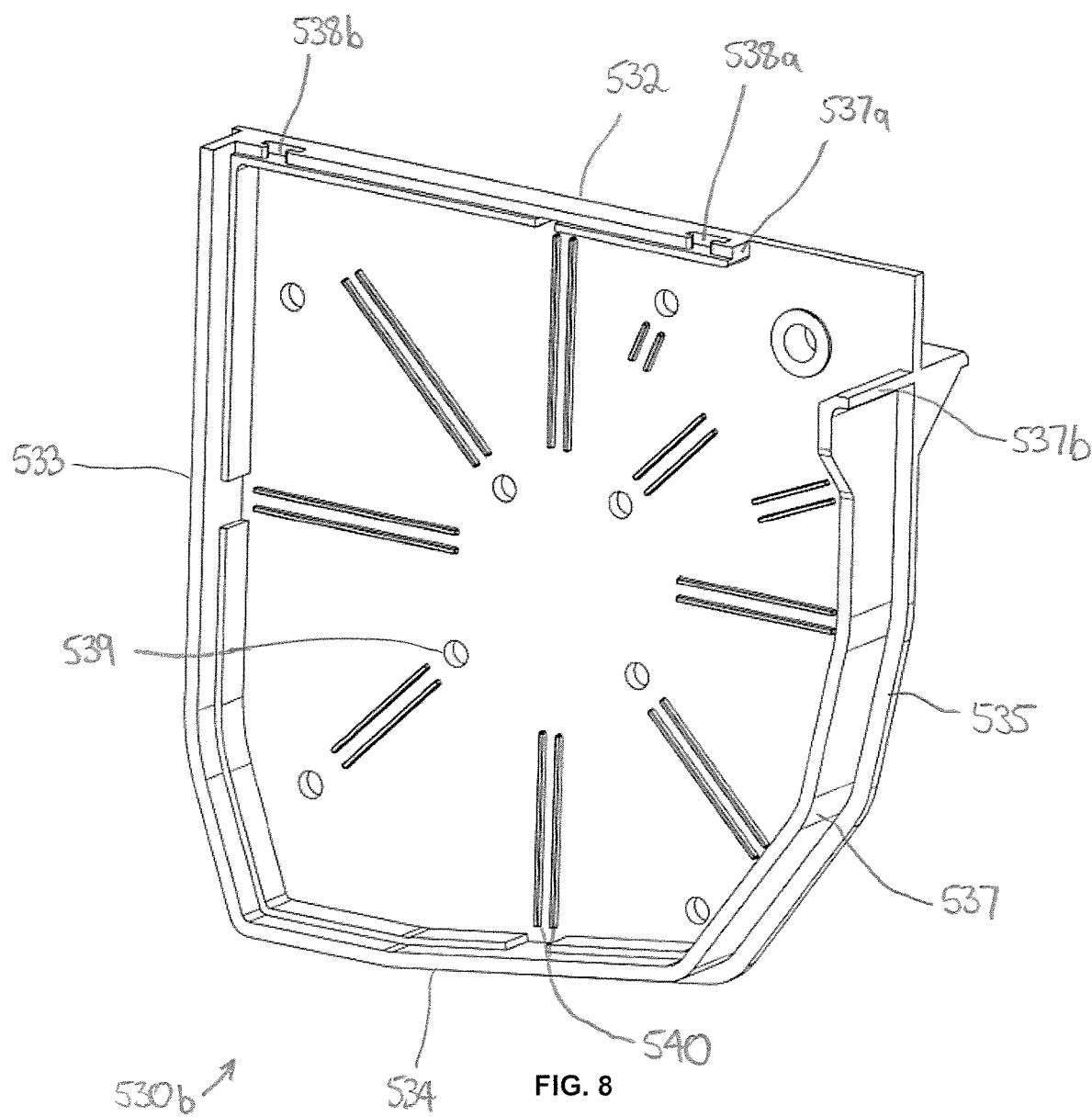
FIG. 8 provides a further perspective view of the end plate of FIG. 7.

Further to the above, FIGS. 7 and 8 provide perspective views of the end plate 530*b* in isolation. The end plate 530*b* defines first, second, third and fourth sides 532-535, as well as inner and outer surfaces 536*a,b* thereof. Projecting perpendicularly inwardly or medially from a portion of the inner surface 536*a* adjacent a portion of the first and fourth sides 532,535, as well as the entire length of the second and third sides 533,534, is a skirt 537. In this manner, the skirt 537 has first and second free ends 537*a,b* between which is defined a space for allowing passage of the drive chain 300 therethrough so as to be received by the receiving plate 520*b*. From FIG. 8, the portion of the skirt 537 extending around the second, third and fourth sides 533-535 is recessed a short distance therefrom so as to define a stepped arrangement for frictionally engaging an internal surface of the housing 510. Conversely, the portion of the skirt 537 extending along the first side 532 is flush therewith and defines a pair of spaced apart receiving channels 538*a,b* therein that are adapted to matingly receive respective engagement members 529*a,b* of the receiving plate 520*b*. It will be appreciated that the skirt 537 also defines, at least in part, the cavity (not shown) between respective end plates 520*a,b* and their adjacent receiving plates 530*a,b*.

As illustrated, the end plate 530*b* includes a plurality of reciprocal engagement apertures 539 (only a single reciprocal engagement aperture 539 is labelled in FIGS. 3, 7 and 8) extending therethrough in a spaced arrangement that are positioned so as to overlie or be co-axial with the engagement apertures 562 of the adjacent and underlying mating elements 561 of the receiving plate 520*b*. In this manner, the end plate 530*b* can be suitably engaged to the receiving plate 520*b* and the housing 510 by way of appropriate fasteners, such as screws, bolts, rivets or the like, which imparts further structural support to the receiving plate 520*b* engaged thereto.

The inner surface 536*a* of the end plate 530*a,b* also includes a plurality of elongate and inwardly extending projections 540 (only a single pair of projections 540 is labelled in FIGS. 3, 7 and 8). As can be observed from FIG. 8, the plurality of projections are arranged in parallel pairs of equal length radiating out from a central portion or axis of the end plate 530*a,b*, with each pair of projections 540 being adapted for matingly receiving therebetween their respective underlying elongate portion of the radial support elements 560*a-j*. Accordingly, the pairs of projections 540 assist in frictionally and securely engaging the end plate 530*a,b* to the receiving plate 520*a,b* as well correctly orientating the end plate 530*a,b* with respect to the housing 510 when engaged thereto.

Referring to FIGS. 3 and 7, the outer surface 536*b* of the end plate 530*a,b* further includes a supporting ledge 541 projecting perpendicularly and laterally outward therefrom. The supporting ledge 541 extends transversely across the end plate 530*b* from the second side 533 to the fourth side 535 thereof and adjacent and parallel with the first side 532.

As can be seen in FIGS. 3 and 7, the supporting ledge 541 has a plurality of apertures 541*a* extending therethrough that facilitate engagement or attachment of the drive system 500 with a portion of the side rail 400 of the roll top cover 1. Integral with the supporting ledge 541 is a cylindrical ring or grommet 542 having a circular receiving aperture 542*a* that extends perpendicularly through the end plate 530B and is adapted for pivotably and slidably receiving an end portion of the drive shaft assembly 550 therein.

In this regard, the drive shaft assembly 550 includes a rotatable drive shaft 551, which has a length that extends axially between the first and second sides 511,512 of the housing 510 and defines free ends. The free ends of the drive shaft 551 are each rotatably disposed within their respective grommets 542 of the end plates 530*a,b* and supported thereby. The drive shaft assembly 550 further comprises a pair of opposed sprockets 552 (and not shown) coaxially engaged with the drive shaft 551 and disposed at respective end portions thereof. In this manner, each of the sprockets 552 (an not shown) is disposed with their respective cavity (not shown) defined by the respective receiving plates 520*a,b* and their adjacent end plates 530*a,b* so as to allow for their unobstructed rotatable movement therewithin.

By the sprockets 552 being positioned just adjacent laterally on either side of the slat assembly 10 and associated drive chain 300, this advantageously acts to provide greater control whilst reducing or dampening any relative twisting and/or side to side movement of the slats 11 during operation of the roll top cover 1. Such an arrangement further allows for a smaller overall size required of the housing 510, as each of the sprockets 552 is positioned just adjacent their respective receiving plate 520*a,b*.

Each of the sprockets includes a plurality of teeth or cogs 553 that have a curved or rounded profile. As demonstrated in FIGS. 2 and 4, each drive chain element 301 of the drive chain 300 includes first and second drive pins 316,317 for operably receiving therebetween the respective cog 553 of the sprocket 552 during operation of the roll top cover 1. In this regard, the first and second drive pins 316,317 are disposed in spaced relation on an outer side 350 of the drive chain element 301 and extend perpendicularly and radially outward therefrom. The first drive pin 316 is curved or rounded rectangular in cross section, whilst the second drive pin 317 is cylindrical in shape having a circular cross section.

In this manner, each of the drive pins 316,317 is curved in profile so as to appropriately and smoothly engage or contact the rounded profile of the respective cog 553 during its rotational passage therebetween. In this way, the power transmission or input contact between the cogs 553 and the drive pins 316,317 of the drive chain element 301 is substantially axial in direction for smooth transmission of power to the drive chain 300 from the drive system 500. Further to this, the drive shaft assembly 550 operably connects the open end 524 of the spiral-shaped channel 521 with the drive rail track 401 of the side rail 400 so as to facilitate passage of the drive pins 316,317 therebetween during operation of the roll top cover 1.

It is envisaged that the drive shaft assembly 550 and, by extension, operation of the roll top cover 1 between retracted and extended positions, can be rotatably driven by any electrically- or mechanically-actuated drive mechanism or module known in the art.

Upon operation of the roll top cover 1 to the retracted position, rotation of the drive shaft assembly 550 in a first direction drives movement of the drive chain 300 and the associated slat assembly 10 from within the drive rail track 401 of the side rail 400 such that the drive pins 316,317 are slidably received by the open end 524 of the spiral-shaped channel 521 of the receiving plate 520a,b. Passage into the spiral-shaped channel 521 provides for relative pivotal movement between each of the plurality of slats 11 and their respective drive chain element 301 by way of a hinge arrangement therebetween so as to form a curved and ultimately spiral arrangement thereof. The drive chain 300 and slat assembly 10 are driven into the housing 510 until a suitable portion of the cargo bed 110 is open and accessible.

Conversely, operation of the roll top cover 1 to the extended position requires rotation of the drive shaft assembly 550 in a second direction. This drives slidable movement of the drive pins 316,317 of the drive chain 300 and the associated slat assembly 10 from within the spiral-shaped channel 521 of the receiving plate 520a,b into the drive rail track 401 of the side rail 400. Upon exiting the spiral-shaped channel 521 at the open end 524 thereof, the drive system 500 facilitates relative pivotal movement between each of the plurality of slats 11 and their respective drive chain element 301 by way of the hinge arrangement so as to form a substantially flattened and co-planar arrangement thereof that extends across the cargo bed 110 of the vehicle 100.

The above description is provided for purposes of description to one of ordinary skill in the related art. It is not intended to be exhaustive or to limit the invention to a single disclosed example. As mentioned above, numerous alternatives and variations will be apparent to those skilled in the art of the above teaching. Accordingly, while some alternative features have been discussed specifically, other features will be apparent or relatively easily developed by those of ordinary skill in the art. The disclosure is intended to embrace all alternatives, modifications, and variations of the disclosure that have been discussed herein, and other features that fall within the spirit and scope of the above described example.

The invention claimed is:

1. A drive system for operation of a roll top cover for covering a cargo bed of a vehicle comprising:
an elongate housing that defines a longitudinal axis and first and second ends, the housing including an axially extending aperture for receiving the roll top cover therethrough;
first and second receiving plates disposed transversely within the housing at the respective first and second ends thereof, the receiving plates comprising opposed spiral-shaped slots extending therethrough, each of the spiral-shaped slots having an open end proximally and a closed end distally; and
a drive shaft assembly disposed within the housing and extending axially between the first and second ends thereof;
wherein the drive shaft assembly is adapted for being operably connected to a drive chain and driving movement thereof within the spiral-shaped slots during operation of the roll top cover; and
wherein each of the receiving plates further comprise a curved channel adjacent the open end of the spiral-shaped slots and extending downwardly therefrom, the curved channel for receiving and rotatably supporting an end portion of the drive shaft assembly therein.

2. The drive system of claim 1, wherein the receiving plates further comprise one or more supporting elements disposed on a lateral surface thereof and extending transversely across their respective spiral-shaped slot.

3. The drive system of claim 2, wherein the supporting elements comprise one or more recessed portions, each recessed portion overlying an open portion of the spiral-shaped slot so as to facilitate passage of the drive chain therethrough.

4. The drive system of claim 1, wherein the housing further comprises a pair of opposed end plates disposed at respective first and second ends thereof, the end plates disposed adjacent their respective receiving plates so as to define a cavity therebetween.

5. The drive system of claim 4, wherein each of the end plates comprise a supporting ledge extending laterally therefrom for attaching to a side rail of the roll top cover.

6. The drive system of claim 1, wherein the drive shaft assembly comprises:
a drive shaft that extends axially within the housing between the first and second ends thereof and defines first and second free ends;
a pair of sprockets coaxially engaged to the drive shaft at opposing ends thereof and adjacent the first and second free ends, the sprockets configured for contacting and driving movement of the drive chain within the spiral-shaped slots.

7. The drive system of claim 6, wherein each of the sprockets is at least partly disposed between their respective receiving plate and end plate within the cavity defined thereby.

8. The drive system of claim 6, wherein the first and second free ends of the drive shaft are rotatably disposed within respective grommets that extend through each of the end plates.

9. A drive system for operation of a roll top cover for covering a cargo bed of a vehicle comprising:
an elongate housing that defines a longitudinal axis and first and second ends, the housing including an axially extending aperture for receiving the roll top cover therethrough;
first and second receiving plates disposed transversely within the housing at the respective first and second ends thereof, the receiving plates comprising opposed spiral-shaped slots extending therethrough, each of the spiral-shaped slots having an open end proximally and a closed end distally; and
a drive shaft assembly disposed within the housing and extending axially between the first and second ends thereof;
wherein the drive shaft assembly is adapted for being operably connected to a drive chain and driving movement thereof within the spiral-shaped slots during operation of the roll top cover; and
wherein the receiving plates further comprise one or more supporting elements disposed on a lateral surface thereof and extending transversely across their respective spiral-shaped slot.

* * * * *